United States Patent
Wighe et al.

(10) Patent No.: US 9,912,639 B1
(45) Date of Patent: Mar. 6, 2018

(54) VERIFYING FIREWALL FILTER ENTRIES USING RULES ASSOCIATED WITH AN ACCESS CONTROL LIST (ACL) TEMPLATE

(71) Applicant: Juniper Networks, Inc., Sunnyvale, CA (US)

(72) Inventors: Chirag Wighe, Milpitas, CA (US); Siva Madasamy, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 139 days.

(21) Appl. No.: 14/980,232

(22) Filed: Dec. 28, 2015

(51) Int. Cl.
*G06F 15/16* (2006.01)
*H04L 29/06* (2006.01)

(52) U.S. Cl.
CPC ........ *H04L 63/0263* (2013.01); *H04L 63/101* (2013.01)

(58) Field of Classification Search
CPC .................. H04L 63/0263; H04L 63/101
USPC ............................ 711/108–118; 713/165–167
See application file for complete search history.

(56) References Cited

U.S. PATENT DOCUMENTS 7,647,643 B2 * 1/2010 Lauer .................. G06F 21/6218
713/165
2010/0165876 A1 * 7/2010 Shukla ................ H04L 41/0806
370/254
2010/0217936 A1 * 8/2010 Carmichael .......... C07D 217/08
711/118
2013/0088966 A1 * 4/2013 Mahkonen .............. H04L 63/12
370/235

OTHER PUBLICATIONS

Kumbhare et al., "OpenFlow Table Type Patterns: Version No. 1.0," https://www.opennetworking.org/images/stories/downloads/sdn-resources/onf-specifications/openflow/OpenFlow%20Table%20Type%20Patterns%20v1.0.pdf, Aug. 15, 2014, 55 pages.

* cited by examiner

*Primary Examiner* — Mohammed Waliullah
(74) *Attorney, Agent, or Firm* — Harrity & Harrity, LLP (57) ABSTRACT

A device may receive a firewall filter entry that includes one or more match conditions associated with filtering network traffic. The device may identify an access control list (ACL) template associated with the firewall filter entry. The ACL template may be associated with a template type. The device may identify one or more rules, for verifying the firewall filter entry, based on the template type associated with the ACL template. The device may verify the firewall filter entry using the one or more rules. The device may determine a hardware resource, for storing the firewall filter entry, based on the template type and based on verifying the firewall filter entry. The device may store the firewall filter entry using the hardware resource of the device.

20 Claims, 5 Drawing Sheets

VERIFYING FIREWALL FILTER ENTRIES USING RULES ASSOCIATED WITH AN ACCESS CONTROL LIST (ACL) TEMPLATE

BACKGROUND

An access control list (ACL) may be implemented on a network device, such as a router, a switch, or the like. The ACL may be applied to filter traffic input to the network device. An entry included in the ACL may specify one or more match conditions and an operation (e.g., an action) to be performed when the match conditions are satisfied. The ACL may be configured to control both inbound and outbound traffic.

SUMMARY

According to some possible implementations, a device may include one or more processors to receive a firewall filter entry that includes one or more match conditions associated with filtering network traffic. The one or more processors may identify an access control list (ACL) template associated with the firewall filter entry. The ACL template may be associated with a template type. The one or more processors may identify one or more rules, for verifying the firewall filter entry, based on the template type associated with the ACL template. The one or more processors may verify the firewall filter entry using the one or more rules. The one or more processors may determine a hardware resource, for storing the firewall filter entry, based on the template type and based on verifying the firewall filter entry. The one or more processors may store the firewall filter entry using the hardware resource of the device.

According to some possible implementations, a non-transitory computer-readable medium may store one or more instructions that, when executed by one or more processors, cause the one or more processors to receive a filter entry associated with an access control list (ACL) template. The filter entry may include one or more match conditions and at least one action, associated with the one or more match conditions, associated with processing network traffic. The one or more instructions may cause the one or more processors to identify a template type of the ACL template. The one or more instructions may cause the one or more processors to determine, based on the template type of the ACL template, one or more rules for verifying the filter entry in association with the ACL template. The one or more instructions may cause the one or more processors to verify the filter entry using the one or more rules. The one or more instructions may cause the one or more processors to selectively allocate, based on the template type of the ACL template and a result of verifying the filter entry, a hardware resource of a device for storage of the filter entry.

According to some possible implementations, a method may include receiving, by a device, a filter entry that includes a template identifier corresponding to an access control list (ACL) template. The method may include identifying, by the device, the ACL template using the template identifier. The ACL template may be associated with one or more match conditions and the template identifier. The method may include identifying, by the device, one or more sets of rules associated with a type of the ACL template. A template type identifier, associated with the ACL template, may identify the type of the ACL template. The method may include verifying, by the device, one or more match conditions of the filter entry using the one or more sets of rules. The method may include selectively storing, by the device, the filter entry in a memory resource of the device based on a result of verifying the one or more match conditions of the filter entry.

DETAILED DESCRIPTION

The following detailed description of example implementations refers to the accompanying drawings. The same reference numbers in different drawings may identify the same or similar elements.

A network device (e.g., a switch, a router, a firewall, etc.) may use an access control list (ACL) to control or filter network traffic (e.g., packets). The ACL may include a filter entry (e.g., a firewall filter entry), or multiple filter entries, as entries in the ACL. In some implementations, the filter entry may specify one or more match conditions (e.g., a source internet protocol (IP) address, a destination IP address, a media access control (MAC) address, a source port identifier, a destination port identifier, etc.) and a corresponding action to be performed when the specified match conditions are satisfied (e.g., allow packet transmission, discard a packet, route the packet in a particular manner, perform a particular type of processing on the packet, etc.).

When assembling the ACL, the network device may store the filter entry using a hardware resource of the network device (e.g., a ternary content-addressable memory (TCAM)). When storing the filter entry, the network device may store a value (e.g., a number, a string, etc.) associated with each match condition of the filter entry.

In addition to storing the filter entry, the network device may store a variable length mask for other possible match conditions not associated with the filter entry. Storing the variable length mask for the other possible match conditions not associated with the filter entry may consume additional resources of the TCAM than storing the values of the match conditions associated with the filter entry alone. By consuming additional resources of the TCAM when storing the filter entry, the network device may not be permitted to store as many filter entries in the TCAM as compared to a case where the additional resources are not consumed (e.g., due to memory limitations of the TCAM), which may limit functionality and/or scalability of the network device when filtering packets.

Additionally, or alternatively, storing multiple variable length masks may prevent the network device from using a longest prefix match (LPM) lookup and/or an exact match hash lookup, thereby limiting functionality of the network device when filtering packets. Additionally, or alternatively, storing multiple variable length masks may prevent the network device from using other hardware resources, such as a static random-access memory (SRAM), a dynamic random-access memory (DRAM), or another type of random-access memory (RAM) (e.g., different from SRAM and/or DRAM), or the like, of the network device to store filter entries. For example, using an SRAM to store filter entries may enable an LPM lookup or an exact match hash lookup, which may conserve a hardware resource and/or increase functionality of the network device when filtering packets as compared to a case where the network device uses the TCAM to store the filter entries.

Implementations described herein enable the network device to verify the match conditions of a filter entry, using one or more sets of rules, and to allocate a hardware resource of the TCAM, SRAM, or the like, for storage of the filter entry. In this way, the network device may conserve a hardware resource (e.g., a memory resource) of the network device that would otherwise be used to store variable length masks for multiple match conditions not associated with the filter entry.

Figure 1A:
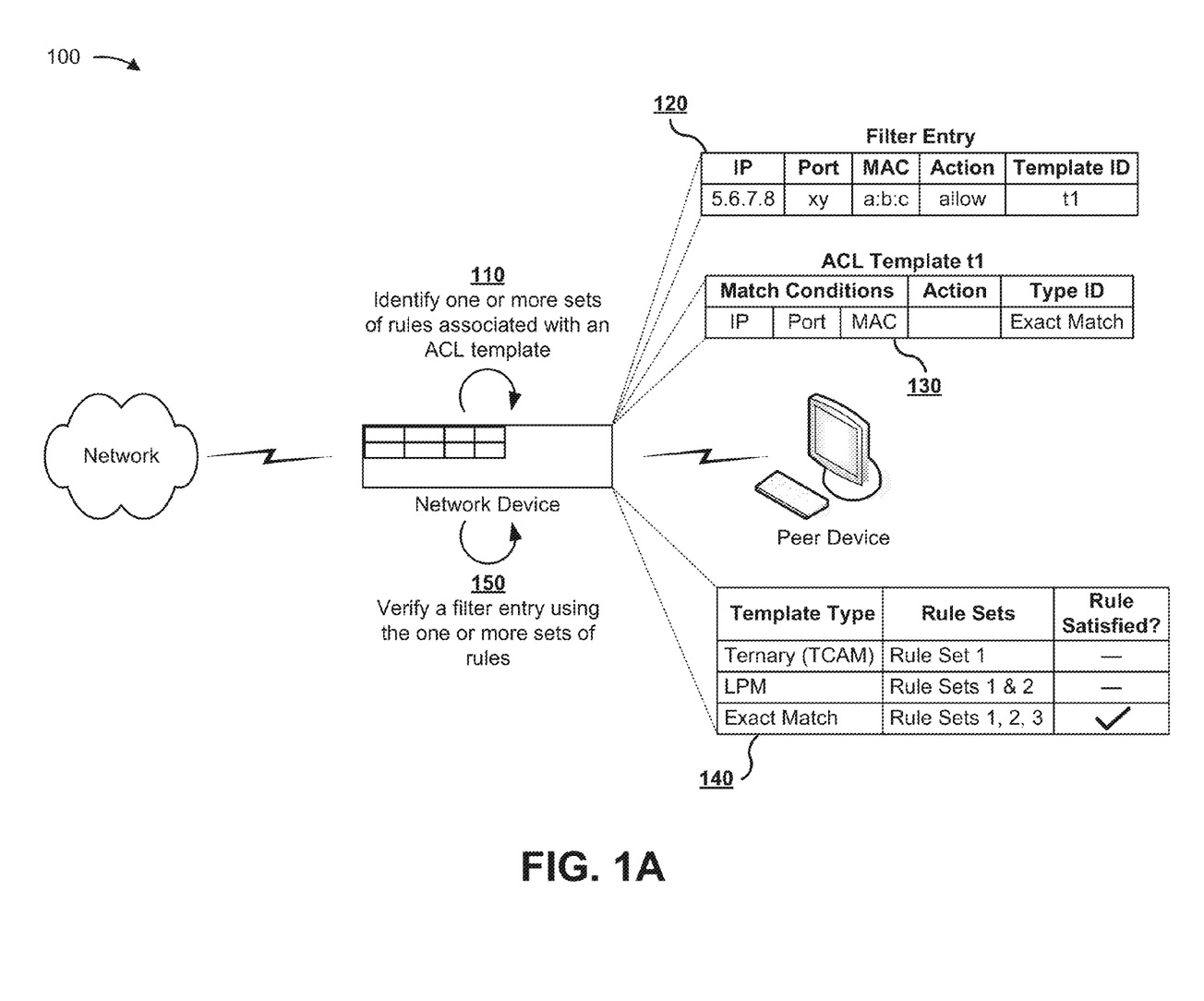
FIGS. 1A and 1B are diagrams of an overview of an example implementation described herein.
Figure 1B:
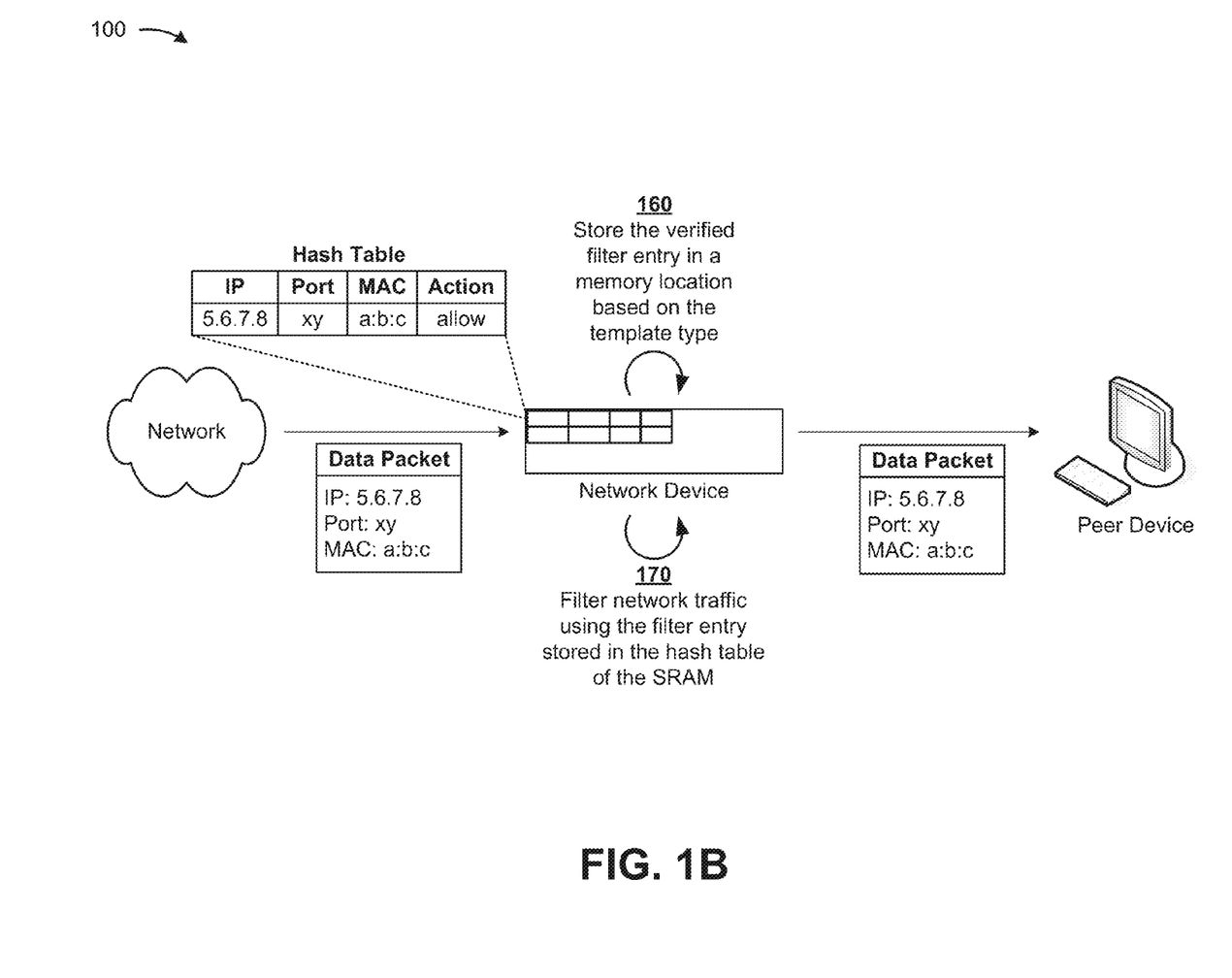

FIGS. 1A and 1B are diagrams of an overview of an example implementation 100 described herein. As shown in FIG. 1A, and by reference number 110, a network device may identify one or more sets of rules associated with an ACL template. The network device may identify the rule(s) based on a type of ACL template, as described below. In example implementation 100, assume that a user provides input, via a management device (not shown), to identify a firewall filter entry and an ACL template associated with the firewall filter entry. Further, assume that the ACL template is associated with a template type.

For example, as shown by reference number 120, the user may define the filter entry to include one or more match conditions, such as an IP address (e.g., shown as "5.6.7.8"), a port identifier (e.g., shown as "xy"), a MAC address (e.g., shown as "a:b:c"), or the like. As further shown by reference number 120, the user may also input an action associated with the filter entry (e.g., shown as "allow") and a template identifier to identify an ACL template with which the filter entry is associated (e.g., shown as "t1"). In some implementations, the match conditions of the filter entry may correspond to the match conditions of the ACL template, such as with ACL template t1, where the match conditions of ACL template t1 include an IP address, a port identifier, and a MAC address, as shown by reference number 130.

The network device may determine an ACL template associated with the filter entry based on the template identifier (e.g., "t1"), and may further determine a template type of the ACL template using a template type identifier (e.g., Type ID) associated with the ACL template. The template type may identify the ACL template as, for example, a ternary template (e.g., a TCAM template), an LPM template, an Exact Match template, or the like. As further shown by reference number 130, assume that ACL template t1 is an Exact Match template (e.g., has a template type of Exact Match).

After determining the template type of the ACL template, the network device may identify the rule(s) associated with the template type. For example, as shown by reference number 140, the network device may identify rule set 1 when the ACL template is a ternary template (e.g., a TCAM template), may identify rule set 1 and rule set 2 when the ACL template is an LPM template, and may identify rule set 1, rule set 2, and rule set 3 when the ACL template is an Exact Match template. In example implementation 100, where the ACL template is an Exact Match template, the network device may identify rule set 1, rule set 2, and rule set 3 as being associated with ACL template t1, based on identifying ACL template t1 as an Exact Match template.

As shown by reference number 150, the network device may verify the filter entry using the one or more sets of rules (e.g., rule set 1, rule set 2, and rule set 3). The specific rules that may be used to verify different types of ACL templates are described in more detail elsewhere herein.

As shown in FIG. 1B, and by reference number 160, once the network device has verified the filter entry using the rule(s), the network device may store the verified filter entry in a memory location based on the template type. For example, in example implementation 100, where the ACL template is an Exact Match template, the network device may store the filter entry using a hash table stored in the SRAM of the network device. Network device 210 may store the filter entry using a hash table in the SRAM because network device 210 may use an exact match hash lookup with a hash table in the SRAM. Additionally, or alternatively, network device 210 may not use a TCAM lookup or an LPM lookup with a hash table in the SRAM.

As shown by reference number 170, the network device may filter network traffic using the filter entry stored in the hash table of the SRAM. For example, the network device may receive network traffic, via a network, destined for a peer device (e.g., another network device, an endpoint device, etc.). The network device may evaluate attributes of the network traffic (e.g., an IP address, a port identifier, a MAC address, etc.) by comparing the attributes of the network traffic to the match conditions of the filter entry stored in the hash table. If the comparison indicates a match between the attributes of the network traffic and the match conditions of the filter entry, the network device may allow the network traffic to proceed to the peer device (e.g., as indicated by the "allow" action).

In this way, a network device may verify a filter entry (e.g., a firewall filter entry) associated with an ACL template using one or more sets of rules, and may allocate a hardware resource of the network device, based on verifying the filter entry, which may conserve a hardware resource of the network device by reducing the storage of unverified filter entries. Additionally, or alternatively, verifying a filter entry may conserve processor resources by preventing the use of rules for an unverified filter entry and may enable a network device to use one or more lookup functions when filtering network traffic.

As indicated above, FIGS. 1A and 1B are provided merely as an example. Other examples are possible and may differ from what was described with regard to FIGS. 1A and 1B.

Figure 2:
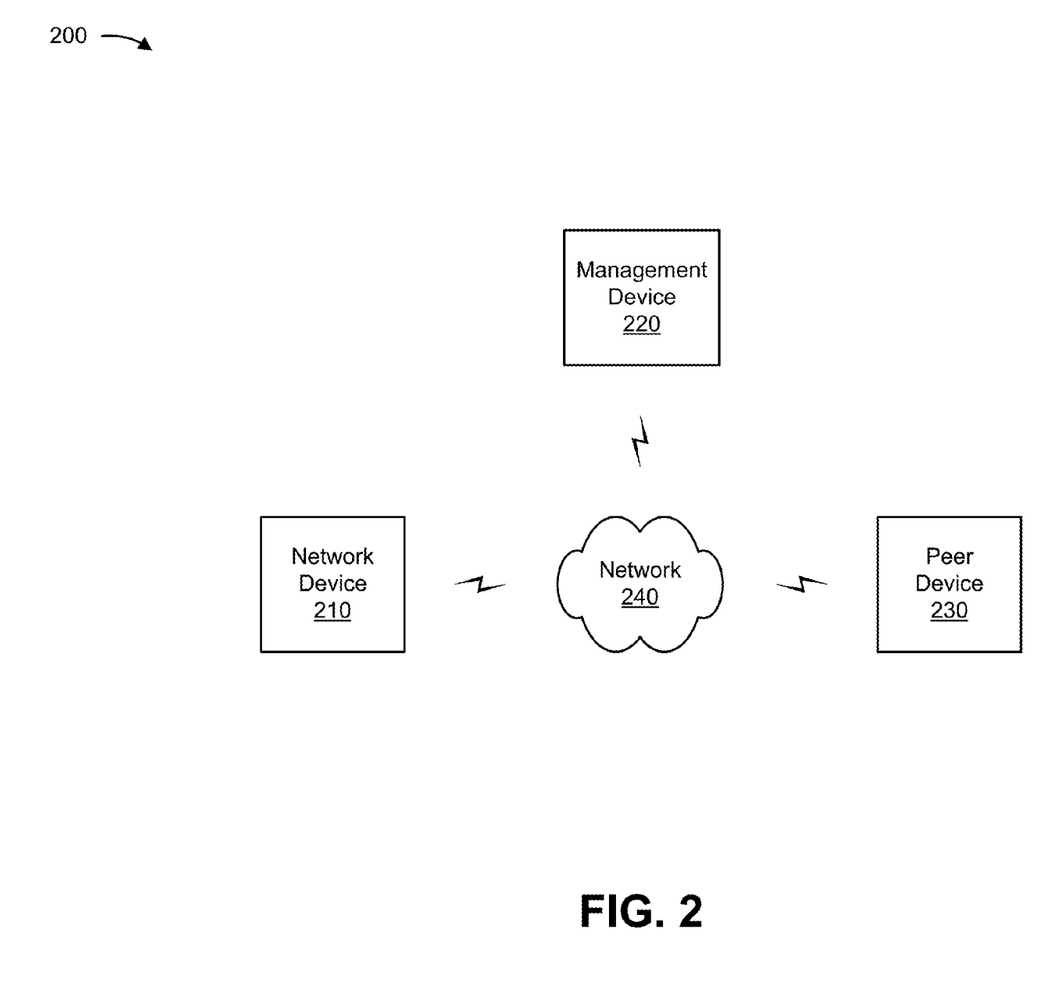
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network device 210, a management device 220, a peer device 230, and a network 240. Devices of environment 200 may interconnect via wired connections, wireless connections, or a combination of wired and wireless connections.

Network device 210 may include one or more devices (e.g., one or more traffic transfer devices) capable of processing and transferring network traffic between endpoint devices. For example, network device 210 may include a firewall, a router, a gateway, a switch, a hub, a bridge, a reverse proxy device, a server device (e.g., a proxy server, a server executing a virtual machine, etc.), a security device, an intrusion detection device, a load balancer device, or a similar device. Network device 210 may include a TCAM, an SRAM, or another type of memory device.

Management device 220 may include one or more devices capable of providing management and/or administration services to devices associated with network 240. For example, management device 220 may include a server device or a similar device. In some implementations, management device 220 may implement policies and rules by sending information (e.g., instructions on implementing policies associated with a service level agreement, a quality of service, etc.) to one or more network devices (e.g., network device 210).

Peer device 230 may include one or more devices capable of receiving and/or providing network traffic. For example, peer device 230 may include a traffic transfer device, such as a router, a switch, a gateway, a firewall, a hub, a bridge, a reverse proxy device, a server device (e.g., a proxy server, a server executing a virtual machine, etc.), a security device, an intrusion detection device, a load balancer device, or a similar device. Additionally, or alternatively, peer device 230 may include an endpoint device that is a source or a destination for network traffic. For example, peer device 230 may include a computer device or a similar device. Peer device 230 may receive network traffic from and/or may provide network traffic to network device 210.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
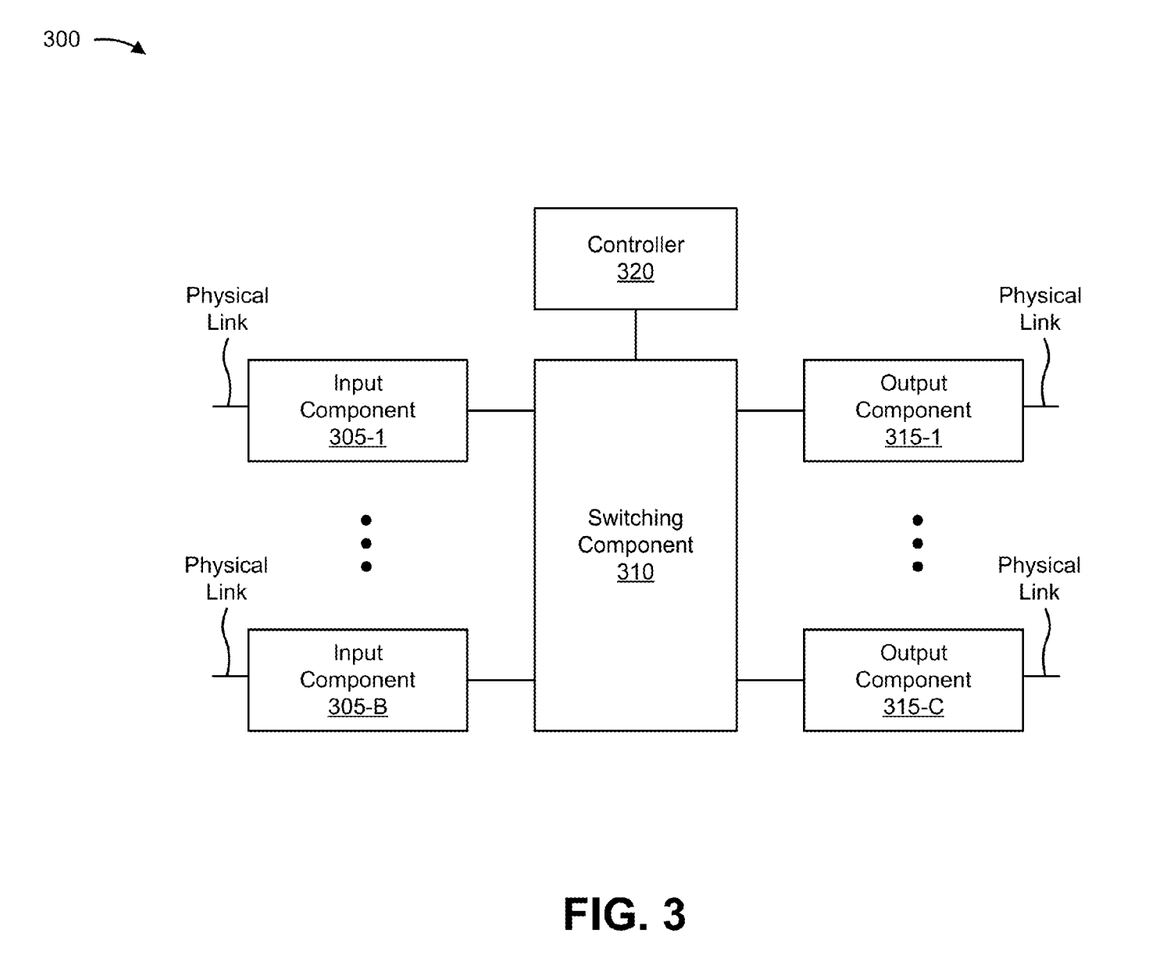
FIG. 3 is a diagram of example components of one or more devices of FIG. 2.

FIG. 3 is a diagram of example components of a device 300. Device 300 may correspond to network device 210, a management device 220, and/or peer device 230. In some implementations, network device 210, management device 220, and/or peer device 230 may include one or more devices 300 and/or one or more components of device 300.

As shown in FIG. 3, device 300 may include a set of input components 305-1, . . . 305-B (B≥1) (referred to individually as input component 305 and collectively as input components 305), a switching component 310, a set of output components 315, . . . , 315-C(C≥1) (referred to individually as output component 315 and collectively as output components 315), and a controller 320. Components of device 300 may interconnect via wired connections, wireless connections, or a combination of wired and wireless connections.

Input component 305 may be a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 may interconnect input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 may be a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (i.e., an input/output component may be a combination of input component 305 and output component 315).

Controller 320 includes a processor in the form of, for example, a central processing unit (CPU), a microprocessor, a field-programmable gate array (FPGA), an application-specific integrated circuit (ASIC), and/or another type of processor that can interpret and/or execute instructions. Controller 320 is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
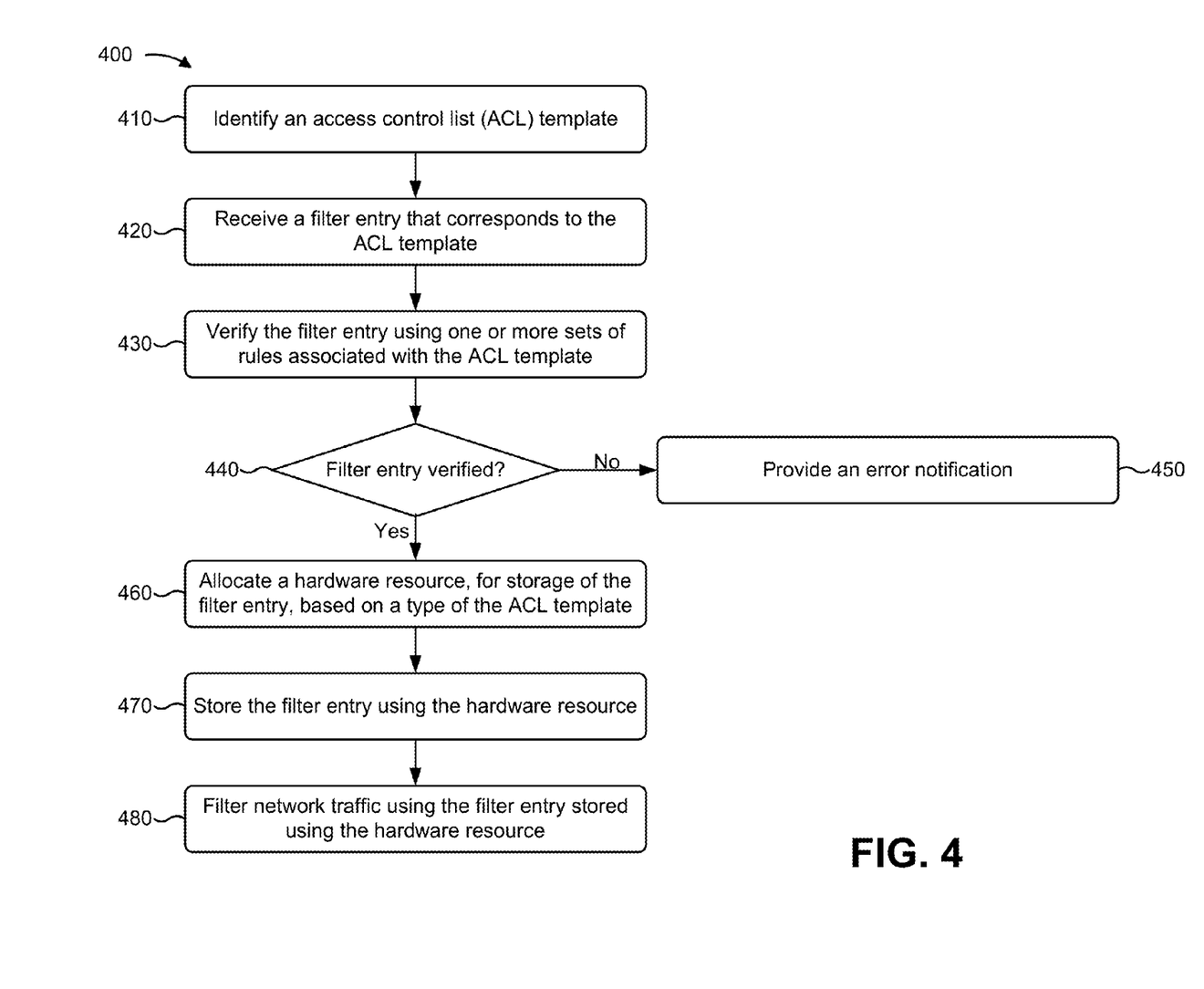
FIG. 4 is a flow chart of an example process for verifying a firewall filter entry using rules associated with an access control list (ACL) template.

FIG. 4 is a flow chart of an example process 400 for verifying a firewall filter entry using rules associated with an access control list (ACL) template. In some implementations, one or more process blocks of FIG. 4 may be performed by network device 210. In some implementations, one or more process blocks of FIG. 4 may be performed by another device or a group of devices separate from or including network device 210, such as management device 220 and/or peer device 230.

As shown in FIG. 4, process 400 may include identifying an access control list (ACL) template (block 410). For example, network device 210 may determine that a user of management device 220 has configured an ACL template (e.g., has input or defined match conditions) in association with the user configuring an ACL. In some implementations, when identifying the ACL template, network device 210 may identify a template identifier (e.g., a value, such as a number, a string, etc.) that identifies the ACL template.

Additionally, or alternatively, a template type identifier (e.g., a value, such as a number, a string, etc.) may be associated with a template type of the ACL template. For example, the template type identifier may indicate that the template type of the ACL template is a ternary template (e.g., a TCAM template), an LPM template, an Exact Match template, or the like. In some implementations, the ternary template type (e.g., a TCAM template type) may indicate that the ACL template is a ternary template (e.g., a TCAM template). In some implementations, the LPM template type may indicate that the ACL template is an LPM template. In some implementations, the Exact Match template type may indicate that the ACL template is an Exact Match template.

In some implementations, an ACL template type may be associated with one or more sets of rules. Additionally, or alternatively, a first ACL template type may be associated with a first set of rules, a second ACL template type may be associated with a second set of rules (e.g., different from the first set), a third ACL template may be associated with a third set of rules (e.g., different from the first set and the second set), etc. In some implementations, one set of rules may include another set of rules. For example, a ternary ACL template (e.g., a TCAM ACL template) may be associated with a first set of rules, an LPM ACL template may be associated with the first set of rules and a second set of rules, an Exact Match ACL template may be associated with the first set of rules, the second set of rules, and a third set of rules, or the like.

As further shown in FIG. 4, process 400 may include receiving a filter entry that corresponds to the ACL template (block 420). For example, network device 210 may receive a filter entry (e.g., a firewall filter entry) corresponding to the ACL template (e.g., for a firewall) identified by network device 210. In some implementations, network device 210 may receive the filter entry based on user input provided via management device 220.

Additionally, or alternatively, network device 210 may associate the filter entry with the ACL template by using a template identifier (e.g., a value, such as a number, a string, etc.), associated with the filter entry, that identifies the ACL template. For example, network device 210 may receive a filter entry that includes a template identifier with a value of "t1," corresponding to an ACL template t1.

As further shown in FIG. 4, process 400 may include verifying the filter entry using one or more sets of rules associated with the ACL template (block 430). For example, network device 210 may use the one or more sets of rules to ensure that the filter entry (e.g., the match conditions of the filter entry, corresponding values for the match conditions, etc.) match the formatting of the ACL template (e.g., restrictions on the included match conditions, restrictions on the values of the match conditions, etc.).

For example, network device 210 may use the first set of rules to verify that every match condition, specified by a filter entry (e.g., associated with a ternary template, or a TCAM template), is included in the ternary template (e.g., which may include one or more match conditions that are not specified by the filter entry). Additionally, or alternatively, the first set of rules may permit the filter entry to include multiple variable length masks with the values of multiple match conditions of the filter entry (e.g., values, such as 1X00X and 100XX, where each X is a variable length mask).

As another example, network device 210 may use the second set of rules to verify that a filter entry, associated with an LPM template, includes the same match conditions included in the LPM template (e.g., that all match conditions included in the filter entry are also included in the LPM template and that there are not any match conditions included in the LPM template that are not included in the filter entry). Additionally, network device 210 may use the second set of rules to verify that the match conditions included with the filter entry have a corresponding value.

Additionally, or alternatively, the second set of rules may restrict the filter entry to include no more than one variable length mask across all the match conditions. Additionally, or alternatively, the second set of rules may restrict the filter entry such that the variable length mask, if included, is at an end (e.g., an ultimate end, a terminal end, etc.) of the value of the match condition that includes the variable length mask (e.g., a value, such as 1000X, where X is the variable length mask). In some implementations, verification of the second set of rules may include verification of the first set of rules (e.g., to verify that the filter entry includes at least one match condition included in the LPM template).

As another example, network device 210 may use the third set of rules associated with the Exact Match template to verify that the filter entry does not include a variable length mask with any values of the match conditions. In some implementations, verification of the third set of rules may include verification of the first set of rules and the second set of rules.

In some implementations, the template type of the ACL template may be associated with a lookup function in the hardware resource in association with verifying the filter entry. For example, the ternary template type (e.g., the TCAM template type) may be associated with a TCAM lookup in the TCAM, which may enable flexible searching of the TCAM. Additionally, or alternatively, the LPM template type may be associated with an LPM lookup in the SRAM, which may conserve a hardware resource. Additionally, or alternatively, the Exact Match template type may be associated with an exact match hash lookup in the SRAM, which may conserve a hardware resource.

In some implementations, network device 210 may use the one or more sets of rules to verify that the filter entry is compatible (e.g., does not cause an error, etc.) with the lookup associated with the template type of the ACL template to which the filter entry is associated. For example, network device 210 may use the one or more sets of rules to verify that a filter entry associated with an Exact Match template does not include a variable length mask because a variable length mask may cause an error during an exact match hash lookup.

In some implementations, network device 210 may use multiple sets of rules in an ordered manner when verifying the rules, such as with the LPM template and the Exact Match template. For example, when verifying a filter entry associated with an LPM template, network device 210 may verify using the first set of rules and then, after using the first set of rules, verify using the second set of rules. Additionally, or alternatively, when verifying a filter entry associated with an Exact Match template, network device 210 may verify using the first set of rules, then the second set of rules, and then, after using the first set of rules and the second set of rules, verify using the third set of rules.

Additionally, or alternatively, when using multiple sets of rules to verify the filter entry, network device 210 may cease verifying the filter entry if the filter entry fails to satisfy one of the multiple sets of rules. For example, assume that network device 210 uses the first set of rules, the second set of rules, and the third set of rules to verify a filter entry associated with an Exact Match template. If network device 210 determines that the filter entry violates the first set of rules, network device 210 may cease verifying the filter entry and not use the second set of rules and/or the third set of rules, even though the Exact Match template is associated with the first set of rules, the second set of rules, and the third set of rules. In this case, after determining that the filter entry violates the first set of rules, network device 210 may reject the filter entry or provide the user of management device 220 with an error notification (e.g., an error message).

In this way, processor resources may be conserved by preventing the use of one or more sets of rules when a filter entry violates one or more other sets of rules associated with an ACL template.

As further shown in FIG. 4, process 400 may include determining whether the filter entry has been verified (block 440). For example, network device 210 may verify the filter entry by using one or more sets of rules, as described above. In some implementations, network device 210 may determine that the filter entry has been verified if the filter entry satisfies the one or more sets of rules associated with the ACL template with which the filter entry is associated. In some implementations, network device 210 may determine that the filter entry has not been verified if the filter entry does not satisfy a rule included in the one or more sets of rules associated with the ACL template with which the filter entry is associated.

As further shown in FIG. 4, if the filter entry has not been verified (block 440—NO), then process 400 may include providing an error notification (block 450). For example, network device 210 may provide an error notification to management device 220, for display to the user, indicating that network device 210 did not verify the filter entry. Additionally, or alternatively, network device 210 may provide the user, via management device 220 or another device, with information indicating a reason why network device 210 did not verify the filter entry. For example, network device 210 may indicate one or more rules that were not satisfied by the filter entry.

As further shown in FIG. 4, if the filter entry has been verified (block 440—YES), then process 400 may include allocating a hardware resource, for storage of the filter entry, based on a type of the ACL template (block 460). For example, after verifying the filter entry, network device 210 may allocate a hardware resource of network device 210 for storage of the filter entry (e.g., a TCAM, an SRAM, or another type of memory device).

In some implementations, network device 210 may allocate the hardware resource based on the template type of the ACL template. For example, network device 210 may allocate a first hardware resource for the storage of a filter entry associated with a first template type and may allocate a second hardware resource for the storage of a filter entry associated with a second template type, where the first hardware resource is a different type of hardware resource than the second hardware resource.

In some implementations, network device 210 may allocate a TCAM resource for the storage of a filter entry associated with a ternary template (e.g., a TCAM template). Additionally, or alternatively, network device 210 may allocate a TCAM resource for the storage of a filter entry associated with an LPM template and/or an Exact Match template. In some implementations, network device 210 may allocate an SRAM resource for the storage of a filter entry associated with an LPM template and/or an Exact Match template. In some implementations, network device 210 may allocate a different type of hardware memory resource (e.g., another type of RAM) for the storage of a filter entry associated with a ternary template (e.g., a TCAM template), an LPM template, or an Exact Match template.

Additionally, or alternatively, network device 210 may allocate the hardware resource of network device 210 for the filter entry after network device 210 has verified the filter entry, rather than allocating the hardware resource before or during the verification. In this way, a hardware resource may be conserved by preventing allocation for filter entries that are not verified.

In some implementations, network device 210 may determine that the hardware resource is not to be allocated based on not verifying the filter entry. For example, network device 210 may not verify a filter entry. In this case, network device 210 may not allocate a hardware resource for the storage of the filter entry, which may conserve a hardware resource by not storing unverified filter entries.

As further shown in FIG. 4, process 400 may include storing the filter entry using the hardware resource (block 470). For example, network device 210 may store the filter entry in the hardware resource of network device 210 after allocating the hardware resource. In some implementations, network device 210 may store the filter entry in the TCAM, the SRAM, or another type of memory device.

In some implementations, network device 210 may store the filter entry in a TCAM table (e.g., stored in the TCAM). For example, network device 210 may store a filter entry associated with a ternary template (e.g., a TCAM template) in the TCAM. Additionally, or alternatively, network device 210 may store a filter entry associated with an LPM template and/or an Exact Match template in the TCAM table. In some implementations, network device 210 may store the filter entry in an LPM table (e.g., stored in the SRAM). For example, network device 210 may store a filter entry associated with an LPM template in the LPM table. Additionally, or alternatively, network device 210 may store a filter entry associated with an Exact Match template in the LPM table.

In some implementations, network device 210 may store the filter entry in a hash table (e.g., an Exact Match table stored in the SRAM). For example, network device 210 may store a filter entry associated with an Exact Match template in the hash table.

In some implementations, network device 210 may store the filter entry using a trie, a digital tree, a radix tree, or another type of data structure in the TCAM or the SRAM (e.g., a linked list, or the like). Additionally, or alternatively, when storing the filter entry in the TCAM or the SRAM, network device 210 may store the filter entry with one or more other filter entries. In some implementations, the filter entry alone, or along with one or more other filter entries, may correspond to an ACL or constitute an ACL.

As further shown in FIG. 4, process 400 may include filtering network traffic using the filter entry stored using the hardware resource (block 480). For example, network device 210 may evaluate network traffic (e.g., network traffic received by network device 210) using one or more stored filter entries, which may correspond to an ACL. In some implementations, network device 210 may compare attributes (e.g., an IP address, a port identifier, a MAC address, a protocol identifier, etc.) of the network traffic to the corresponding match conditions of the filter entry.

In some cases, the filter entry may include a corresponding action that network device 210 is to perform on the network traffic if the match conditions of the filter entry are satisfied by the network traffic. For example, if the attributes of the network traffic match the match conditions of the filter entry, then network device 210 may provide the network traffic to peer device 230 or another device. Conversely, for example, the filter entry may include a discard action, where network device 210 discards the network traffic if the attributes of the network traffic match the match conditions of the filter entry.

In some implementations, one or more default actions may apply if the attributes of the network traffic do not match the corresponding match conditions of the filter entry, such as a default action to forward the network traffic for further processing, to drop the network traffic, to quarantine the network traffic, to delay transmission of the network traffic, or the like. Additionally, or alternatively, network device 210 may cease evaluating the network traffic after comparing the network traffic to the filter entry. Additionally, or alternatively, the filter entry may be associated with a port, a routed port, a virtual local area network (VLAN), or the like associated with network device 210, for filtering network traffic passing via the port, the routed port, the VLAN, or the like, rather than filtering all network traffic passing via network device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may enable a network device to conserve a hardware resource when storing a filter entry associated with an ACL. The network device may allocate a hardware resource to a filter entry that includes match conditions that correspond to match conditions included in an ACL template. This may conserve a hardware resource that would otherwise be used to store all possible match conditions for filtering network traffic.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive a firewall filter entry that includes one or more match conditions associated with filtering network traffic;
identify an access control list (ACL) template associated with the firewall filter entry,
the ACL template being associated with a template type;
identify one or more rules, for verifying the firewall filter entry, based on the template type associated with the ACL template;
verify the firewall filter entry using the one or more rules;
determine a hardware resource of the device, for storing the firewall filter entry, based on the template type and based on verifying the firewall filter entry; and
store the firewall filter entry using the hardware resource,
a first type of hardware resource being used to store the firewall filter entry when the template type is a first template type; and
a second type of hardware resource being used to store the firewall filter entry when the template type is a second template type, the first type of hardware resource being a different type of hardware resource than the second type of hardware resource.

2. The device of claim 1, where the hardware resource includes a ternary content-addressable memory (TCAM) or a static random-access memory (SRAM).

3. The device of claim 1, where the firewall filter entry includes a template identifier that identifies the template type; and
where the one or more processors, when identifying the ACL template, are to:
identify the ACL template based on the template identifier included in the firewall filter entry.

4. The device of claim 1, where the ACL template includes at least one of:
a ternary ACL template,
a longest prefix match (LPM) ACL template, or
an Exact Match ACL template.

5. The device of claim 1, where the one or more rules include:
a first set of rules when the template type is the first template type,
a second set of rules when the template type is the second template type, or
a third set of rules when the template type is a third template type,
the first set of rules being different from the second set of rules,
the first set of rules being different from the third set of rules, and
the second set of rules being different from the third set of rules.

6. The device of claim 1, where the hardware resource includes at least one of:
a ternary content-addressable memory (TCAM) and the firewall filter entry is stored in a TCAM table in the TCAM, or
a static random-access memory (SRAM) and the firewall filter entry is stored in a longest prefix match (LPM) table or in a hash table in the SRAM.

7. The device of claim 1, where the one or more processors, when verifying the firewall filter entry, are to:
determine that the firewall filter entry does not satisfy the one or more rules; and
provide an error message indicating that the firewall filter entry does not satisfy the one or more rules.

8. A non-transitory computer-readable medium storing instructions, the instructions comprising:
one or more instructions that, when executed by one or more processors, cause the one or more processors to:
receive a filter entry associated with an access control list (ACL) template,
the filter entry including one or more match conditions and at least one action, associated with the one or more match conditions, associated with processing network traffic;
identify a template type of the ACL template;
determine, based on the template type of the ACL template, one or more rules for verifying the filter entry in association with the ACL template;
verify the filter entry using the one or more rules; and
selectively allocate, based on the template type of the ACL template and a result of verifying the filter entry, a hardware resource of a device for storage of the filter entry,
a first type of hardware resource being allocated for storage of the filter entry when the template type is a first template type; and
a second type of hardware resource being allocated for storage of the filter entry when the template type is a second template type,
the first type of hardware resource being a different type of hardware resource than the second type of hardware resource.

9. The non-transitory computer-readable medium of claim 8, where the hardware resource includes at least one of:
a ternary content-addressable memory (TCAM), or
a type of random-access memory (RAM).

10. The non-transitory computer-readable medium of claim 8, where the one or more instructions, that cause the one or more processors to selectively allocate the hardware resource, cause the one or more processors to:
allocate, for storage of the filter entry, at least one of:
a ternary content-addressable memory (TCAM) table when the template type of the ACL template is the first template type,
a longest prefix match (LPM) table or the TCAM table when the template type of the ACL template is the second template type, or
a hash table, the LPM table, or the TCAM table when the template type of the ACL template is a third template type.

11. The non-transitory computer-readable medium of claim 8, where the one or more instructions, that cause the one or more processors to verify the filter entry, cause the one or more processors to:
determine that the filter entry does not satisfy the one or more rules; and
provide an error message indicating that the filter entry does not satisfy the one or more rules.

12. The non-transitory computer-readable medium of claim 8, where the one or more rules include:
a set of rules that verify that every match condition, specified by the filter entry, corresponds to a match condition specified by the ACL template.

13. The non-transitory computer-readable medium of claim 8, where the one or more rules includes a set of rules that:
verify that all match conditions, specified by the filter entry, are included in the ACL template; and
verify that there are not any match conditions, included in the ACL template, that are not specified by the filter entry.

14. The non-transitory computer-readable medium of claim 8, where the one or more rules include:
a set of rules that verify that values associated with the one or more match conditions of the filter entry do not contain a variable length mask.

15. A method, comprising:
receiving, by a device, a filter entry that includes a template identifier corresponding to an access control list (ACL) template;
identifying, by the device, the ACL template using the template identifier, the ACL template being associated with:
one or more match conditions, and
the template identifier;
identifying, by the device, one or more sets of rules associated with a type of the ACL template,
where a template type identifier associated with the ACL template identifies the type of the ACL template;

verifying, by the device, one or more match conditions of the filter entry using the one or more sets of rules; and selectively storing, by the device, the filter entry in a memory resource of the device based on a result of verifying the one or more match conditions of the filter entry, a first type of memory resource of the device being used to store the filter entry when the type of the ACL template is a first type of the ACL template; and a second type of memory resource of the device being used to store the filter entry when the type of the ACL template is a second type of the ACL template, the first type of memory resource being a different type of memory resource than the second type of memory resource.

16. The method of claim 15, where the memory resource includes at least one of:
 a ternary content-addressable memory (TCAM), or
 a type of random-access memory (RAM).

17. The method of claim 15, where the one or more sets of rules includes:
 a first set of rules associated with the first type of the ACL template,
 where the first type of the ACL template is a ternary template,
 a second set of rules associated with the second type of the ACL template,
 where the second type of the ACL template is a longest prefix match (LPM) template, or
 a third set of rules associated with a third type of the ACL template,
 where the third type of the ACL template is an exact match template.

18. The method of claim 15, where selectively storing the filter entry in the memory resource of the device comprises:
 storing the filter entry when the one or more match conditions of the filter entry are verified, or
 generating an error message when the one or more match conditions of the filter entry are not verified.

19. The method of claim 15, where the memory resource of the device includes:
 a ternary content-addressable memory (TCAM) where a TCAM table in the TCAM is associated with a ternary ACL template,
 a random-access memory (RAM) where a longest prefix match (LPM) table in the RAM is associated with a LPM ACL template, or
 a RAM where a hash table in the RAM is associated with an Exact Match ACL template.

20. The method of claim 15, further comprising:
 filtering network traffic using the one or more match conditions of the filter entry after storing the filter entry in the memory resource.

\* \* \* \* \*